United States Patent [19]
Bonora

[11] 3,800,352
[45] Apr. 2, 1974

[54] KITCHEN CLEANING UTENSIL

[76] Inventor: Aldo L. Bonora, 432-B Beren Rd., Walden, N.Y. 12586

[22] Filed: Oct. 30, 1972

[21] Appl. No.: 301,888

[52] U.S. Cl............................ 15/105, 294/2, 294/51
[51] Int. Cl............................................. A47l 25/00
[58] Field of Search.................. 15/142, 105, 236 R; 30/123 R, 150, 169; 294/51, 2; 4/190, DIG. 4

[56] References Cited
UNITED STATES PATENTS

| | | | |
|---|---|---|---|
| 1,718,496 | 6/1929 | Smith | 30/169 |
| 490,577 | 1/1893 | Memminger | 30/169 |
| 2,338,647 | 1/1944 | Koon | 15/236 R |
| 1,746,877 | 2/1930 | Tompkins | 15/236 R |

FOREIGN PATENTS OR APPLICATIONS 519,521   3/1940   Great Britain ..................... 30/150

*Primary Examiner*—Leon G. Machlin
*Attorney, Agent, or Firm*—Joseph L. Spiegel

[57] ABSTRACT

A kitchen cleaning utensil is especially designed for scraping and raking out foodstuff and the like that collects in a kitchen sink strainer. The utensil includes a head member having a circular scraping edge. The diameter of the head member is less than that of a kitchen sink strainer. A plurality of flexible, side-by-side teeth extend longitudinally from a portion of the edge of the head member. The utensil is curved about a longitudinal axis parallel to the teeth and is capable of being flexed under pressure, whereby its head member may be used for scraping foodstuff and the like from the upper sidewall of a kitchen sink strainer and the teeth may be used for raking out foodstuff and the like from the lower opening of the strainer.

The purpose of this abstract is to enable the public and the Patent Office to determine rapidly the subject matter of the technical disclosure of the application. This abstract is neither intended to define the invention of the application nor is it intended to be limiting as to the scope thereof.

1 Claim, 4 Drawing Figures

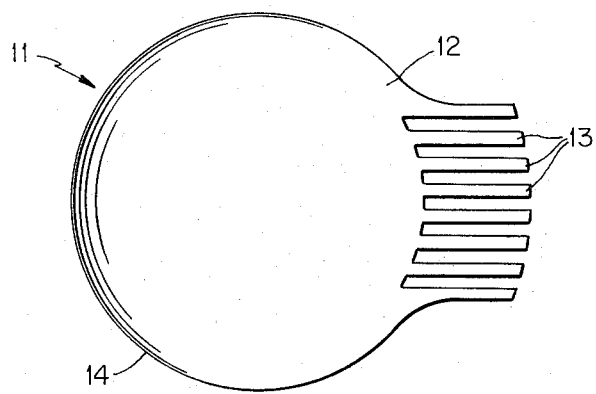
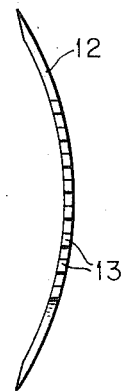
FIG. 1  FIG. 2
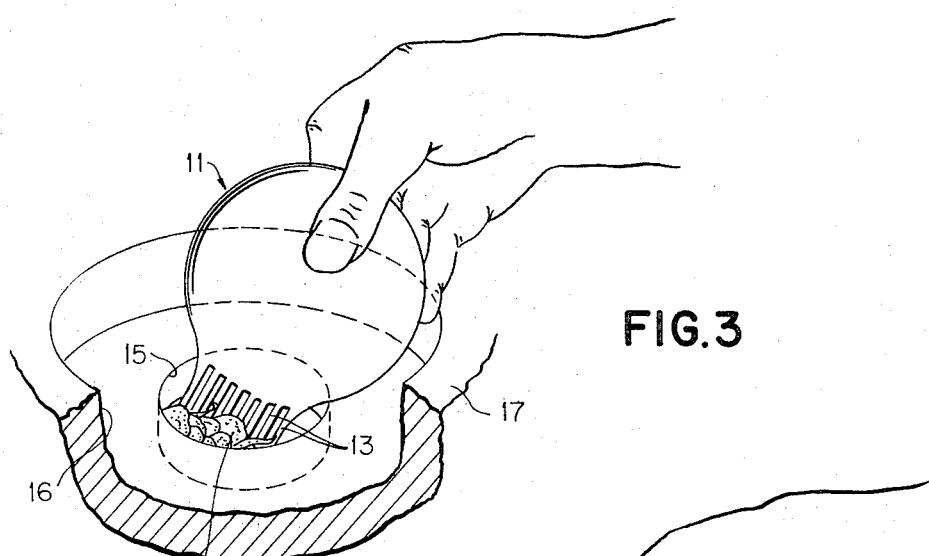
FIG. 3
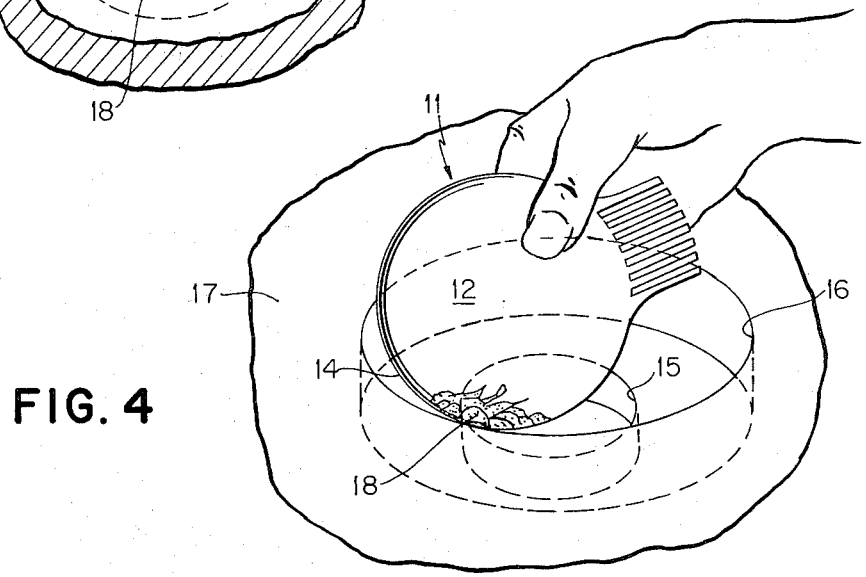
FIG. 4

KITCHEN CLEANING UTENSIL

BACKGROUND OF THE INVENTION

1. Field of the Invention

This invention relates to a kitchen utensil designed for scraping and raking out foodstuff and the like that collects in a kitchen sink strainer.

2. Description of the Prior Art

A recurring problem to the house wife is the collection of grease, dirt, food particles and the like in the strainer of a kitchen sink after cleaning off food, washing dishes, scrubbing pots and pans and the like. Normally one attempts to scoop up or pick out the foodstuff with the fingers. This is unpleasant and has not proved satisfactory due to wear and tear on fingers and fingernails. Additionally, a certain amount of the foodstuff is forced downwardly causing drain clogging.

Others have designed hand scraping and cleaning utensils. See, for example, the U.S. Pat. to Kuever, No. 2,747,911; and, the U.S. Pat. to Tupper, No. 2,828,502. The U.S. Pat. to Seifert, No. 3,427,636 describes a kitchen hand tool for pushing garbage to and through a drain opening in a sink bottom, but until now no one has designed a satisfactory utensil for scraping and raking out foodstuff from the kitchen sink strainer.

SUMMARY OF THE INVENTION

An object of the invention is a kitchen utensil for scraping and raking out foodstuff and the like that collects in a kitchen sink strainer.

Another object is such a utensil which is efficient and convenient to use, economical, durable, cleanable, and which reduces wear and tear on the finish of the sink strainer.

These and other objects are accomplished in accordance with the teachings of the present invention, one illustrative embodiment of which comprises, a kitchen cleaning utensil that includes a head member with teeth depending therefrom. The head member has a circular scraping edge of a diameter less than that of a kitchen sink drain. A plurality of flexible, side-by-side teeth extend longitudinally from a portion of the head member. The utensil is curved about a longitudinal axis parallel to the teeth and is capable of being flexed under pressure, whereby the head member may be used for scraping foodstuff and the like from the upper sidewall of a kitchen sink strainer and the teeth may be used for raking out foodstuff and the like from the lower opening of the strainer.

BRIEF DESCRIPTION OF THE DRAWING

The foregoing and other objects, features and advantages of the invention will be apparent from the following, more particular description of the preferred embodiments of the invention, as illustrated in the accompanying drawing, wherein:

FIG. 1 is a side view of the novel kitchen utensil of the present invention;

FIG. 2 is a bottom view of the novel kitchen utensil;

FIG. 3 is a perspective view partially broken away, and partly in phantom showing the teeth of the kitchen utensil in use to rake out foodstuff from the lower opening of a kitchen sink strainer; and, FIG. 4 is a perspective view partly broken away and partly in phantom showing the circular edge of the head member of the kitchen utensil being used to scrape off food-stuff and the like from the upper sidewall of a kitchen sink strainer.

DESCRIPTION OF THE PREFERRED EMBODIMENTS

Referring to FIG. 1 of the drawing there is shown a novel kitchen utensil 11 of the present invention. The utensil 11 is preferably made of material of relatively thin gage typically one sixteenth of an inch thick. Typical materials are thermoplastic materials such as polyethylene, polyvinyls, rubber and other substances having similar physical characteristics. Such materials are preferred because they are capable of being flexed and of returning to their original position. They may be used on stainless steel and porcelain surfaces without scratching same. They are non-absorptive, odorless, resistant to chemicals at ordinary temperatures. The materials do not soften at water temperatures normally used in a kitchen sink and are capable of repeated use without wearing out and losing their shape-retaining characteristics.

The utensil 11 is shown as including a head member 12 with teeth 13 depending therefrom.

The head member 12 is generally circular and is preferably beveled about most of its periphery to form a scraping edge 14. The member 12 is so dimensioned as to be less than the diameter of a kitchen sink strainer so that it may be readily inserted therein. In a typical embodiment the diameter of the circle formed in the plane of the circular edge 14 is 2.6 inches. It is intended that the edge 14 of the member 12 be used to scrape foodstuff and the like from the upper sidewall of the sink strainer.

The utensil 11 further includes a plurality of side-by-side teeth 13 extending longitudinally from a portion of the edge of member 12. The teeth 13 are rigid enough for strength, yet flexible enough for effective raking action. In a typical embodiment teeth 13 are three-fourths of an inch long, one-eighth of an inch thick and spaced apart approximately one-sixteenth of an inch.

It is preferable to utilize the same material in formation of the teeth 13 as in the formation of the head member 12. Formation may be any of the known forming methods including compression, injection and blow molding as well as vacuum forming.

As best seen in FIG. 2, the utensil 11 is curved about a longitudinal axis parallel to the teeth 13.

While the utensil 11 may be used for removing hardened food from dishes, pots, and pans and the like, it is primarily intended to remove foodstuffs and the like from hard-to-get at areas within a kitchen sink, in particular the strainer.

FIG. 3 and 4 illustrate the use of the utensil 11 in the lower opening 15 and upper sidewall 16 portions of a sink strainer 17. FIG. 3 depicts the tooth portion of utensil 11 being used to rake out foodstuff 18 from the lower opening 15. The teeth 13 are so spaced so as to engage and scrape the grilled portions within lower opening 15 while the overall curvature to the utensil 11 facilitates the raking out of the foodstuff from the lower opening 15 of the strainer 17.

As best seen in FIG. 4, foodstuff 18 is scraped from the upper sidewall 16 of strainer 17 by bringing the edge 14 of utensil 11 into contact therewith. The fact that head member 12 is smaller than the drain opening, the edge 14 is circular and that the member 12 is deformable upon application of local pressure, assures that there will be maximum contact between the scraping edge 14 and the sidewall 16 throughout a scraping motion.

The novel utensil of the present invention minimizes wear and tear on the hands and fingers of an individual and reduces wear and tear on the kitchen strainer finish. It reduces the amount of foodstuff that is usually forced down into the drain when fingers are used, thus helping to eliminate drain clog ups.

While the invention has been particularly shown and described with reference to the preferred embodiments thereof, it will be understood by those skilled in the art that various changes and omissions can be made therein without departing from the spirit and scope of the invention.

What is claimed is:

1. A kitchen cleaning utensil especially designed for scraping out foodstuffs and the like that collect in a kitchen sink strainer, comprising:

A circular head member;

said head member having an edge portion from which elongated, blunt-ended teeth extend in spaced, side-by-side substantially parallel relation to form a rake for raking out foodstuff and the like from the lower opening of a kitchen sink strainer;

the lengthwise portions of said teeth being parallel to a longitudinal axis;

said head member and teeth being curved to provide a concavity facing said longitudinal axis; and, the remainder of said head member edge being beveled for scraping foodstuff and the like from the upper side-wall of a kitchen sink strainer said utensil being made of flexible material for carrying out its intended purpose.

* * * * *